July 24, 1951 J. E. HURLBERT 2,561,701
FIRE EXTINGUISHING ATTACHMENT FOR TRACTORS
Original Filed Jan. 27, 1947 2 Sheets-Sheet 1
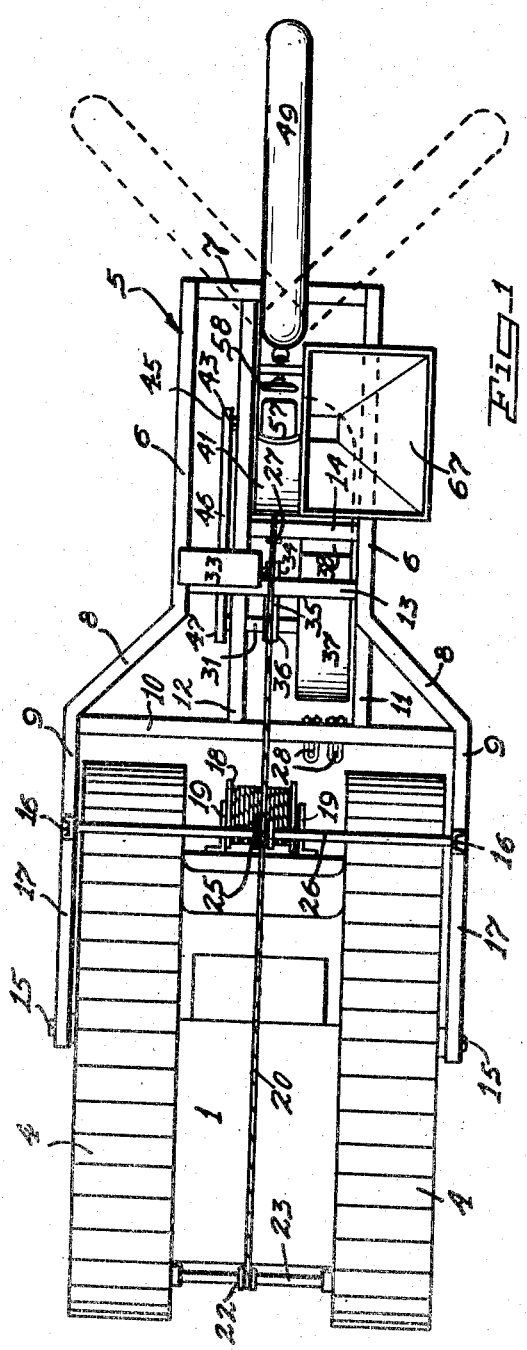
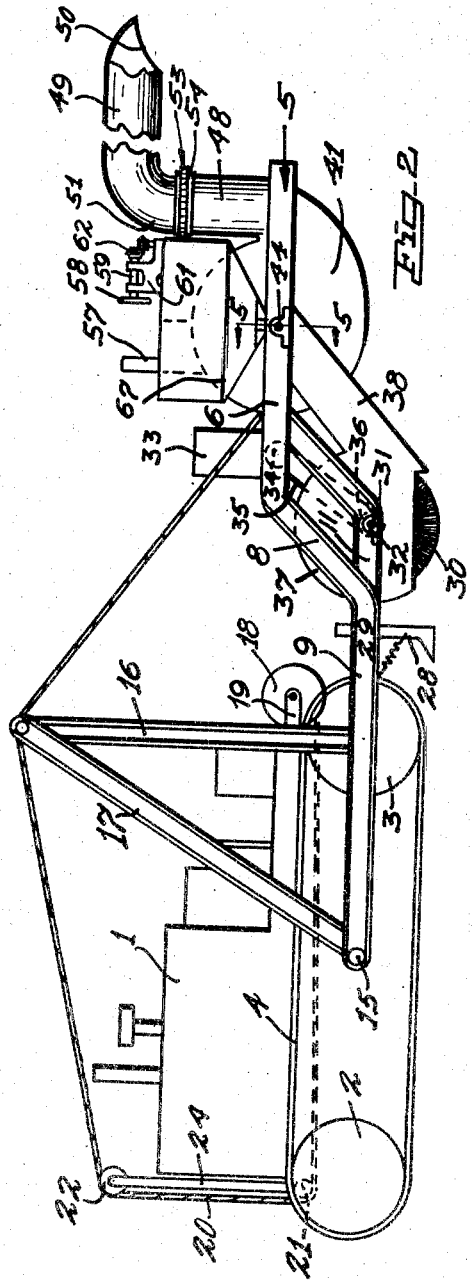
Inventor
John E. Hurlbert
By
Glenn L. Fish
Attorney

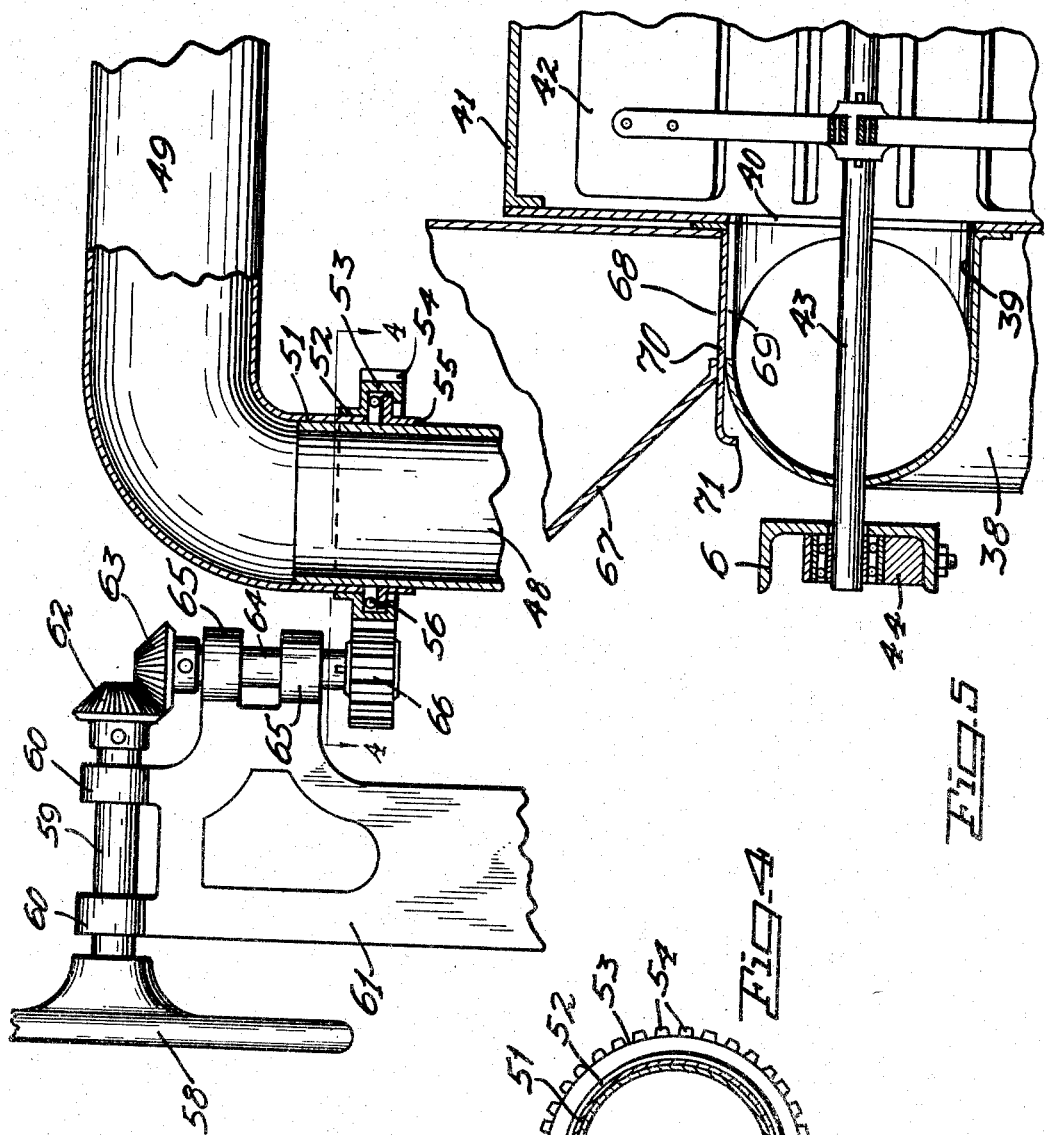

Patented July 24, 1951

2,561,701

UNITED STATES PATENT OFFICE 2,561,701

FIRE-EXTINGUISHING ATTACHMENT FOR TRACTORS

John E. Hurlbert, Dishman, Wash.

Substituted for application Serial No. 724,676, January 27, 1947. This application November 19, 1949, Serial No. 128,422

3 Claims. (Cl. 169—1)

This invention relates to a fire extinguishing apparatus for use upon a tractor, the present application constituting a substitution for my former application filed January 27, 1947 and having Ser. No. 724,676.

One object of the invention is to provide an apparatus of this character which can be mounted back of a tractor and drawn across a field and serve to remove dust and dirt from the ground and blow the same upon grass, grain, or low brush in order to extinguish flames.

Another object of the invention is to provide a fire extinguishing apparatus including a rotary brush which is rotated at sufficient speed to pick up dust and dirt from the ground and throw the dirt into a spout extending rearwardly from a hood for the brush, the said spout leading to a suction fan which blows the dirt through a discharge spout projecting rearwardly from the frame of the apparatus and so mounted that it may be swung horizontally to adjusted positions and thus allow the dirt to be distributed over a large area of grass or grain which it is desired to extinguish.

Another object of the invention is to provide a fire extinguishing apparatus having scrapers mounted in front of its rotary brush so that ground may be broken up by the scrapers and thus reduced to fine dirt which may be readily taken up by the brush and thus supply a large quantity of dirt for extinguishing fire.

Another object of the invention is to provide a fire extinguisher having the spout of its brush hood extending rearwardly at an upward incline for communication with the suction fan, there being a hopper mounted over the upper or rear end of the spout so that dirt may be shoveled into the hopper and pass therefrom into the fan.

Another object of the invention is to provide a fire extinguisher having its frame provided with side bars which project forwardly and are adapted to be pivotally mounted at opposite sides of a tractor, improved means being provided for tilting the frame vertically to adjusted positions and supporting the frame in the adjusted position to hold the scrapers and the rotary brush in predetermined relation to the ground.

With these and other objects in view the invention consists of a special construction and arrangement of parts illustrated in the accompanying drawings wherein:

Fig. 1 is a top plan view showing the improved fire extinguishing apparatus hitched to a tractor.

Fig. 2 is a side elevation of the fire extinguishing apparatus and the tractor.

Fig. 3 is a fragmentary view upon an enlarged scale showing the discharge pipe and its adjusting means partially in section and partially in side elevation.

Fig. 4 is a transverse sectional view taken along the line 4—4 of Figure 3.

Fig. 5 is a fragmentary sectional view upon an enlarged scale taken along the line 5—5 of Figure 2.

The tractor 1 to which the fire extinguishing apparatus has been shown applied is of conventional construction and may be any dimensions desired. The usual front and rear wheels 2 and 3 are provided at sides of the tractor and about these wheels pass endless tracks or treads 4 by means of which the tractor is moved along the ground.

The apparatus has a frame 5 which may be formed of metal or other suitable material and has side bars 6 joined at their rear ends by a bridge or end bar 7. The side bars substantially midway their ends to provide portions 8 which connect the arms or front end portions 9 of the side bars with the rear portions thereof and upon referring to Figures 1 and 2 it will be seen that these intermediate portions of the side bars extend rearwardly at an upward incline and also inwardly in converging relation to each other. Therefore the rear portion of the frame is offset upwardly with respect to its forward portion and of less width than the said forward portion. A cross bar 10 extends transversely of the frame between rear ends of the arms or forward portions 9 of the side bars and from this cross bar extend supports 11 and 12 which extend longitudinally of the frame and have their forward portions in the plane of the forward portion of the frame and are bent in spaced relation to their front ends so that their rear portions are in the plane of the rear portion of the frame. There have also been provided bars 13 and 14 which extend transversely of the rear portion of the frame near the front end thereof.

The arms or front end portions 9 of the side bars are spaced from each other that the frame may straddle the rear portion of the tractor with its arms disposed along opposite sides thereof and have their front ends pivotally mounted by pins 15 for vertical swinging movement to vertically adjust the frame. Posts 16 are mounted vertically upon the arms midway the length thereof and these posts are braced against movement out of a vertical position by braces 17 extending diagonally between front ends of the arms and upper ends of the posts. A drum 18 is rotatably mounted between brackets 19 at the back of the tractor and upon this drum is wound a cable 20 which extends forwardly under the body of the tractor and is engaged with a pulley 21 at the front end thereof. From the pulley 21 the cable extends upwardly and is engaged with a second pulley 22 carried by a rod 23 which extends transversely of the tractor and is supported by the arms of a U-shaped bracket 24 mounted vertically and disposed transversely of the tractor at the front end thereof. After engaging the pulley 22 the cable extends rearwardly of the tractor and is engaged with a third pulley 25 carried by a rod 26 extending transversely of the frame and supported upon upper ends of the posts 16, and from the pulley 25 the cable extends rearwardly at a downward incline and is anchored to the cross bar 14 by tieing it about this cross bar, as shown at 27, or in any other desired manner. By turning the drum the cable may be wound thereon or unwound from the drum and the frame thus raised or lowered and then held in the vertically adjusted position with scrapers 28 disposed in desired relation to the ground. These scrapers are carried by and extend downwardly from the cross bar 10 and yieldably held against rearward tilting movement by springs 29 and when they are in engagement with the ground forward movement of the tractor and the frame will cause the scrapers to loosen the soil and reduce dry soil to fine dirt. When the frame is swung upwardly to a position in which the scrapers are out of contact with the ground the fire extinguisher may be moved from one place to another without interference by the scrapers.

The loose dirt is to be taken up and distributed upon burning grass or grain and in order that the dirt may be removed there has been provided a rotary wire brush 30 which is rotably mounted by a shaft or axle 31 extending transversely of the frame and rotatably mounted in bearings 32 carried by the supporting bars 11 and 12 and disposed back of the scrapers in rearwardly spaced relation thereto. An engine 33 is mounted near the front end of the rear portion of the frame and its shaft carries a pulley 34 about which is engaged a belt 35 which extends downwardly therefrom at a rearward incline and is engaged about a pulley 36 carried by the shaft 31 of the brush and imparts rapid rotary motion to the brush. A metal hood 37 fits about the upper portion of the rotary brush and is provided with an outlet spout 38 which extends rearwardly at an upward incline and at its upper end is formed with a side extension or outlet 39 projecting from its inner side and communicating with the centrally located inlet 40 formed in a side wall of the housing 41 of a suction fan or blower 42. This fan has a shaft 43 which extends transversely through the housing and has one end portion passing through the upper or rear end of the spout 38, the end portions of the shaft being rotatably mounted in bearings 44 carried by the supporting bar 12 and one of the side bars of the frame. At its inner end the shaft 43 carries a pulley 45 about which engages a belt 46, the said belt extending downwardly from the pulley and having its lower portion engaged about a pulley 47 carried by the shaft or axle 31 of the rotary brush. Therefore rotary motion will be transmitted from the brush shaft and during operation of the fire extinguisher the fan will be operated and loose dirt sucked upwardly through the spout 38 and into the fan housing from which it is discharged at high speed through the upwardly extending outlet neck 48 of the housing.

Dirt which is discharged from the fan housing through the neck 48 passes through a discharge pipe 49 which has its front end cut to form a spout 50 and has its rear end portion formed with a downwardly extending neck 51. The neck 51 is surrounded by a collar 52 having a depending flange 53 about its peripheral edge, and about this flange are formed teeth 54. It will thus be seen that the collar serves as a gear as well as serving as a collar. The flange of the collar 52 fits snugly about a collar 55 surrounding the neck 48 and between the two collars is disposed a thrust bearing 56 which is held in place by the flange 53 and allows the pipe to be turned easily about the neck of the fan housing. The pipe may therefore be readily swung horizontally about the neck of the fan housing and dirt blown through the pipe distributed over a large area. Horizontal swinging movement of the pipe is performed by a workman who occupies the seat 57 and grasps the hand wheel 58 at the front end of a shaft 59 which is rotatably mounted through bearings 60 at the upper end of a support 61 carried by and projecting upwardly from the rear portion of the frame. At its rear end the shaft 59 carries a beveled pinion 62 which meshes with a companion pinion 63 carried by the upper end of a shaft 64 rotatably mounted through bearings 65 at the rear side of the support or column 61. Rotary motion will thus be transmitted from shaft 59 to shaft 64 and as this shaft 64 carries at its lower end a gear 66 which meshes with teeth of the gear formed by the collar 52 the pipe 40 will be swung in an arcuate path about the neck of the fan housing. The operator occupying the seat 57 may thus cause the dirt to be scattered over an area of any desired width within the limits of the transverse movement of the pipe.

In some instances it may be desired to discharge dirt without moving the tractor and the fire extinguisher forwardly or it may be desirable to mix a powdered chemical with the dirt. In order to do so there has been provided a hopper 67 which is mounted above the rear portion of the frame and located at one side of the fan housing. This hopper is open at its top so that the dirt may be shoveled into it and at its bottom the hopper is formed with an outlet opening 68 towards which walls of the hopper slope. The outlet of the hopper registers with an inlet opening 69 formed through the top of the side extension 39 of the spout 38 and when dirt passes through the outlet 68 and into the uper end of the spout it will be drawn into the fan housing by action of the fan and then blown out of the fan housing through the neck 48 and discharged through the pipe 49 along with dirt which is picked up by the rotary brush and sucked through the spout. A gate 70 which is slidably mounted for movement across the outlet 68 into and out of closing relation thereto normally closes this opening so that air will not be drawn inwardly from the hopper when the hopper is empty and reduce suction through the spout 38, and upon referring to Figure 5 it will be seen that the outer end of the door is bent downwardly to form a lip 71 by means of which the door may be grasped and readily shifted longitudinally to an opened or closed position.

Having thus described the invention, what is claimed is:

1. A fire fighting attachment for a tractor comprising a main frame including side bars having parallel front and rear portions and intermediate portions extending rearwardly and upwardly at an inward incline between the said front and rear portions, a bridging bar extending transversely of the frame between front ends of the side bars, a cross bar extending transversely of said frame between rear ends of the said front portions of the sidebars, said frame being of a width adapting its forward portion to straddle the rear portion of a tractor and front ends of its side bars being adapted to be pivoted to opposite sides of the tractor for vertical tilting movement to adjusted positions, posts extending upwardly from the side bars in forwardly spaced relation to front and rear ends of the front portions thereof, braces for said posts extending diagonally between upper ends of said posts and front ends of said side bars, a rod supported transversely of said frame between upper ends of said posts, a pulley upon said rod midway its length, an auxiliary frame adapted to be mounted upright upon said tractor across the front end thereof and having a cross rod, a pulley midway its length, a drum carried by said tractor, a cable wound upon said drum and trained about said pulleys with a portion extending rearwardly of the main frame from the tractor and secured to the rear portion of the main frame adjacent the front end of the said rear portion thereof, supports extending rearwardly from said cross bar, scrapers carried by and extending downwardly from said cross bar between said supports, a shaft rotatably mounted between said supports, a rotary brush carried by said shaft, an engine carried by the rear portion of said frame, means for transmitting rotary motion from said engine to said rotary shaft, a hood mounted about the upper portion of said brush and having a spout extending rearwardly therefrom at an upward incline, a suction fan mounted in the rear portion of said frame and including a housing having an inlet at a center of one side with which the upper end of the spout communicated, means for transmitting rotary motion from the brush shaft to the suction fan, a discharge pipe leading from the fan housing and mounted for horizontal swing movement to adjusted positions, a hopper mounted over the rear portion of said frame and communicating with the upper end of said spout, and a movable closure for controlling flow of material from said hopper into said spout.

2. A fire extinguishing apparatus comprising a frame adapting to be mounted longitudinally of a tractor and project rearwardly therefrom, said frame having side bars spaced from each other a distance adapting them to extend forwardly along opposite sides of the tractor and be pivotally connected therewith for vertical tilting movement to adjusted positions, posts extending upwardly from said bars in spaced relation to front ends thereof, a rod supported transversely of said frame upon upper ends of said posts, a pulley carried by said rod, a drum adapted to be rotatably mounted at the rear of the said tractor, a cable wound about said drum and trained about said pulley with a portion extending rearwardly therefrom and secured to said frame for supporting the frame in a vertically adjusted position, a shaft rotatably mounted transversely of said frame rearwardly of said tractor, a rotary brush carried by said shaft, a cross bar mounted transversely of said frame forwardly of said brush, scrapers carried by and extending downwardly from said cross bar, a hood about the upper portion of said brush having a spout extending rearwardly therefrom at an upward incline, a suction fan in the rear portion of said frame including a housing having a center inlet at one side communicating with the rear end of said spout and an outlet neck extending upwardly from its rear portion, a hopper mounted over and communicating with the rear end of said spout, an adjustable closure for the outlet of said hopper, an engine carried by said frame for driving the brush shaft and the suction fan, and a discharge pipe leading from the neck of said fan.

3. A fire extinguishing apparatus constituting an attachment for a tractor and comprising a frame adapted to be mounted back of a tractor and drawn forwardly thereby, a rotary brush rotatably mounted transversely of said frame, scrapers carried by said frame in advance of said brush, a hood for said brush having a rearwardly extending spout, a suction fan carried by said frame and having an inlet communicating with said spout, said fan having an outlet neck extending upwardly at its rear, a discharge pipe extending rearwardly from said frame and having its front end rotatably mounted upon the upper end of said neck and thereby pivotally mounted for horizontal swinging movement to adjusted positions, a gear about the front end of said pipe, a vertical support carried by said frame forwardly of said pipe, a shaft rotatably mounted across the upper end of said support and having a wheel at its front end and a bevelled pinion at its other end, and a second shaft rotatably mounted vertically along said support rearwardly thereof and having at its upper end a bevelled pinion meshing with the first pinion and at its lower end a gear meshing with the gear about said pipe.

JOHN E. HURLBERT.

REFERENCES CITED

The following references are of record in the file of this patent and in the parent case:

UNITED STATES PATENTS

| Number | Name | Date |
|---|---|---|
| 1,176,408 | Skrzyszewski | Mar. 21, 1916 |
| 1,982,192 | Baumgarten | Nov. 2, 1934 |
| 2,132,790 | Jeswine | Oct. 11, 1938 |